United States Patent [19]
Hubbell et al.

[11] Patent Number: 5,733,393
[45] Date of Patent: Mar. 31, 1998

[54] TIRE HAVING GOOD DIVERSE PROPERTIES

[75] Inventors: David Ray Hubbell, Hartville; Marc Christopher Nowacki, Uniontown; John Robert Kullman, Brunswick; Jeffrey Leon Sevart, Broadview Heights; Piotr Janusz Wesolowski, Cuyahoga Falls, all of Ohio

[73] Assignee: The Goodyear Tire & Rubber Company, Akron, Ohio

[21] Appl. No.: 588,034

[22] Filed: Jan. 17, 1996

[51] Int. Cl.⁶ .............. B60C 11/00; B60C 11/12; B60C 101/00; B60C 103/00
[52] U.S. Cl. .............. 152/209 R; 152/154.2; 152/DIG. 3
[58] Field of Search .............. 152/209 R, 209 D, 152/DIG. 3, 154.2

[56] References Cited

U.S. PATENT DOCUMENTS

| | | |
|---|---|---|
| D. 280,090 | 8/1985 | Graas . |
| D. 283,501 | 4/1986 | Hitzky . |
| D. 310,803 | 9/1990 | Hasegawa . |
| D. 329,218 | 9/1992 | Ohtsu . |
| D. 334,360 | 3/1993 | Graas et al. . |
| D. 342,047 | 12/1993 | Takahashi . |
| D. 346,350 | 4/1994 | Himuro et al. . |
| D. 380,427 | 7/1997 | Hubbell, Jr. ............ D12/147 |
| 3,759,306 | 9/1973 | Greiner et al. ............ 152/209 R |
| 3,768,537 | 10/1973 | Hess et al. ............ 152/209 R |
| 4,407,346 | 10/1983 | Bandel et al. ............ 152/209 R |
| 4,986,324 | 1/1991 | Suzuki et al. . |
| 5,269,357 | 12/1993 | Killian . |
| 5,373,882 | 12/1994 | Nakagawa . |

FOREIGN PATENT DOCUMENTS

| | | | |
|---|---|---|---|
| 2084954 | 6/1993 | Canada ............ | 152/209 R |
| 105822 | 4/1984 | European Pat. Off. ............ | 152/209 R |
| 435620 | 7/1991 | European Pat. Off. ............ | 152/209 R |
| 128904 | 1/1982 | Japan ............ | 152/209 R |
| 268709 | 11/1987 | Japan ............ | 152/DIG. 3 |
| 7602 | 1/1991 | Japan ............ | 152/209 R |
| 197806 | 7/1992 | Japan ............ | 152/209 R |
| 201609 | 7/1992 | Japan ............ | 152/209 R |

*Primary Examiner*—Steven D. Maki
*Attorney, Agent, or Firm*—David E. Wheeler

[57] ABSTRACT

A tire that has a tread base compound and a tread cap compound that have synergistic properties, an extra wide center rib, stiff shoulder lugs, and lateral grooves between shoulder lugs that do not vary significantly in width has a superior combination of rolling resistance properties, traction properties, noise properties, and wear properties. Also the RSAT of the tire can be fine tuned by chamfering edges of lugs in the tire.

20 Claims, 5 Drawing Sheets

5,733,393

TIRE HAVING GOOD DIVERSE PROPERTIES

BACKGROUND OF THE INVENTION

The invention relates to pneumatic tires for use on automobiles and light trucks.

In the art, tires are designed for a specific purpose, and tires designed for one purpose very often have poor properties when used for another purpose. For example, tires designed specifically for use in snow are noisy and often provide a rough ride when used on dry pavement. Similarly, tires that are designed to be quiet, often have poor traction properties in wet conditions.

Since tires are used in a broad range of conditions, and there is an increasing demand that tires run quietly, it is a continuing goal in the art to maximize all properties of a tire.

It is the object of this invention to provide a tire which is quiet, has good handling properties, good wear properties, good all season traction qualities (wet, dry and snow), good gas mileage, and provides a smooth ride, all in a combination of excellence that has never, heretofore, been achieved.

SUMMARY OF THE INVENTION

In a pneumatic tire comprising a pair of parallel annular beads, at least one radial carcass ply wrapped around the beads, a tread radially above a crown portion of the tire, and sidewalls disposed between the tread and the beads, the tread comprises a tread base and a tread cap wherein tread base rubber has a 300% modulus of 16 to 19 MPa, a tensile strength at break of 17.5 to 22.5 MPa, elongation at break of 270 to 435%, RT (room temperature) rebound of 57 to 64, a tan delta at 10% strain of 0.075 to 0.11, G' at 1% strain of 1770 to 2070 KPa, a G' at 50% strain of 790 to 1010 KPa, and an E' of 0.1 to $0.13 \times 10^9$ dynes/cm$^2$, and said tread cap rubber has a 300% modulus of 8 to 11 MPa, a tensile strength at break of 15 to 20 MPa, an elongation at break of 420 to 530%, RT Rebound of 45 to 54, a tan delta at 10% strain of 0.090 to 0.12, G' at 1% strain of 990 to 1350 KPa, a G' at 50% strain of 540 to 700 KPa, E' of 0.06 to $0.08 \times 10^9$ dynes/cm$^2$. The tread depth in the shoulder of the tread is about 84% to 100% of the maximum tread depth and the lateral grooves in the shoulder of the tire have an angle of 75 to 90 degrees with respect to the center line (CL) of the tread. All lateral grooves vary from each other in width less than 25%, and a circumferential scribe line separates the shoulder blocks into two portions, an inner portion which has a width comprising 10% to 40% of the width of a shoulder block as measured from the shoulder of the tire to a circumferential groove, and an outer portion. The scribe line has a depth of 8% to 16% of the tread depth. Walls of circumferential grooves in the tread have an angle of 5 to 20 degrees with respect to a line perpendicular to the tread surface. The carcass of the tire is shaped in a mold to have a footprint factor of less than 1.3 at standard inflation and load. The term G' is the storage modulus (dynamic modulus) of an elastomer measured at shear. The term E' is the storage modulus (dynamic modulus) of an elastomer measured at tension.

In an illustrated embodiment, the tread has a center rib having a width of 10.5% to 15% of the tread width, the tread base comprises 10% to 70% of the undertread thickness, and intermediate elements or ribs are mirror images of each other.

In the illustrated embodiment, shoulder blocks are chamfered on at least one lateral groove edge.

Also traction rectangles are provided in the tread cap rubber in the shoulder region, outside the normal contact surface of the tread, to provide traction in severe cornering.

In the illustrated embodiment, lateral sipes are positioned to equalize stiffness of tread elements in the circumferential direction regardless of the size of the tread element and all lateral grooves between shoulder lugs are the same width.

RSAT of the tire can be fine tuned by chamfering lug edges in the tread pattern.

Tire treads, for retreading, can be provided having the parameters and characteristics defined with respect to the tire of the invention.

DETAILED DESCRIPTION OF THE INVENTION

Figure 1:
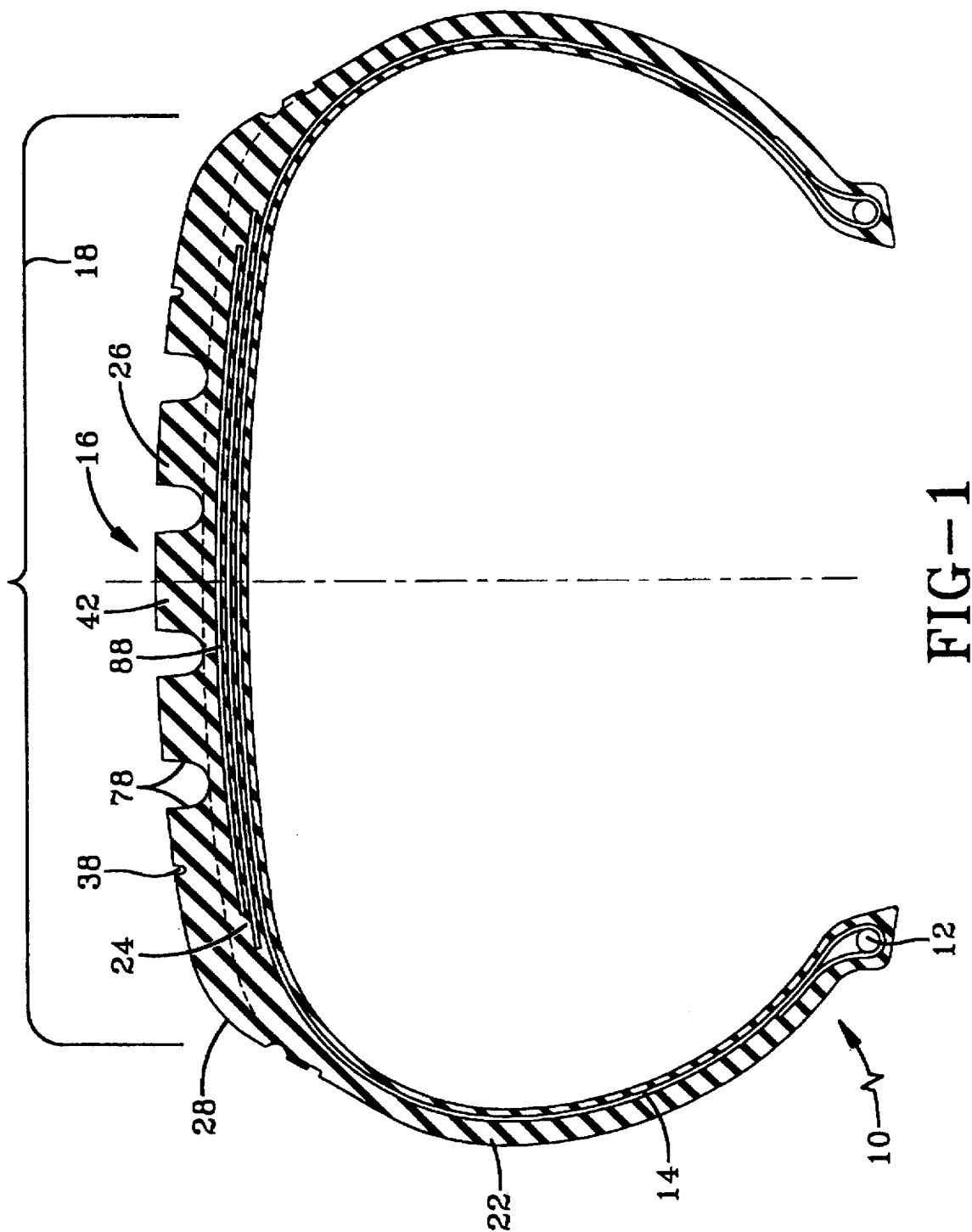
FIG. 1 illustrates a cross section of the tire of the invention.

With reference now to FIG. 1, a cross-section of tire 10 of the invention shows parallel annular beads 12, at least one carcass ply 14 wrapped around beads 12, tread 16 disposed over carcass ply 14 in a crown area 18 of the tire, and sidewalls 22 disposed between the tread 16 and the beads 12.

In the tire 10 of the invention, tread 16 comprises a tread base 24 and a tread cap 26. Tread base 24 and tread cap 26 work together to give the tread flexibility and rebound properties that enhance the wear, mileage, handling and traction properties described for the tire.

Tread base 24 comprises a 100% natural rubber composition that has a 300% modulus of 16 to 19 MPa, a tensile strength at break of 17.5 to 22.5 MPa, elongation at break of 270 to 435%, RT (room temperature) rebound of 57 to 64, a tan delta at 10% strain and 100° C. of 0.075 to 0.11, G' at 1% strain of 1770 to 2070 KPa, a G' at 50% strain of 790 to 1010 KPa, and an E' of 0.1 to $0.13 \times 10^9$ dynes/cm$^2$.

For example, a compound having the general properties of tread base 24 comprises the following:

| Parts by weight per 100 parts rubber | Ingredients |
|---|---|
| 100 | NR (Natural Rubber) |
| 45–65 | Carbon Black |
| 5–20 | Silica |
| 5–15 | Processing oil, aromatic |

Plus conventional amounts of zinc oxide, stearic acid, waxes, antidegradants, sulfur and both sulfenamide and tetrathiuram disulfide accelerators Tread cap 26 comprises a 30/55/15 blend of SBR/NR/3,4 polyisoprene rubber that has a 300% modulus of 8 to 11 MPa, a tensile strength at break of 15 to 20 MPa, an elongation at break of 420 to 530%, RT Rebound of 45 to 54, a tan delta at 10% strain and 100° C. of 0.090 to 0.12, G' at 1% strain of 990 to 1350 KPa, a G' at 50% strain of 540 to 700 KPa, E' of 0.06 to $0.08 \times 10^9$ dynes/cm$^2$.

For example, a compound having the general properties of tread cap 26 is a rubber blend which comprises the following:

| Parts by weight per 100 parts rubber | Ingredients |
| --- | --- |
| 10–35 | SBR (Styrene Butadiene Rubber) oil extended |
| 50–75 | NR (Natural Rubber) |
| 10–35 | 3,4 polyisoprene |
| 35–50 | Carbon black |
| 5–20 | Silica |
| 5–15 | Processing oil, aromatic |

Plus conventional amounts of zinc oxide, stearic acid, waxes, antidegradants, sulfur and both sulfenamide and tetrathiuram disulfide accelerators Both the tread cap and tread base compounds may be prepared, for example, by including conventional amounts of sulfur vulcanizing agents which may vary from about 1.1 to about 1.5 phr, antidegradants (including waxes) which may vary from about 1 to 2 phr, activators which may vary from about from about 2 to 6 phr, and accelerator which may vary from about 1.1 to 1.4 phr. Specifically, the amount of zinc oxide may vary from about 1.5 to 2.5 phr, the amount of stearic acid may vary from about 2 to 3 phr, and the amount of waxes may vary from about 3 to 4 phr.

The rubber composition can conveniently be prepared by first mixing the ingredients exclusive of the sulfur and accelerator curatives in a non-productive mix stage and the resultant mixture mixed with the sulfur and accelerator curatives in a productive mix stage as is conventional in the art as illustrated by U.S. Pat. No. 4,515,713.

The tread cap 26 and tread base 24 are preferably coextruded.

The elastomer compositions are vulcanized at elevated temperature and pressure.

In addition to the complementary properties provided by tread base 24 and tread cap 26, the design of the tread enhances the desired properties of the tire.

The tread is designed so that tread depth in shoulder 28 of the tread is 84% to 100%, preferably 84% to 92% of the tread depth of center rib 42, the maximum tread depth in the tire. The reduced tread depth in the shoulder area increases the stiffness of the shoulder elements to provide less wear and better handling properties. In addition, a circumferential scribe line 38 separates shoulder blocks 30 into an axially outer portion 30a and an axially inner portion 30b. Scribe line 38 is located such that inner portion 30b comprises 10% to 40% of the shoulder block width as measured from the shoulder 28 of the tire to the circumferential groove 70, and the scribe line 38 has a depth of 8% to 16% of the maximum tread depth, and a width of 2% to 5% of the shoulder block width.

In the illustrated embodiment, the width and depth of scribe line 38 are both 1 mm.

The circumferential scribe line 38 provides a venting effect for the lateral sipes in the shoulder of the tire. When sipes open and close during rotation of a tire, they alternately fill up with and expel air. When the air is expelled, it sometimes causes a noticeable hissing noise, because the air is expelled through a closing sipe. The scribe line provides a larger opening for air to escape, to help prevent this hissing noise.

The scribe line also provides an additional edge for wet and snow traction in the first 8 to 10 thousand miles of use on the tire.

Figure 2:
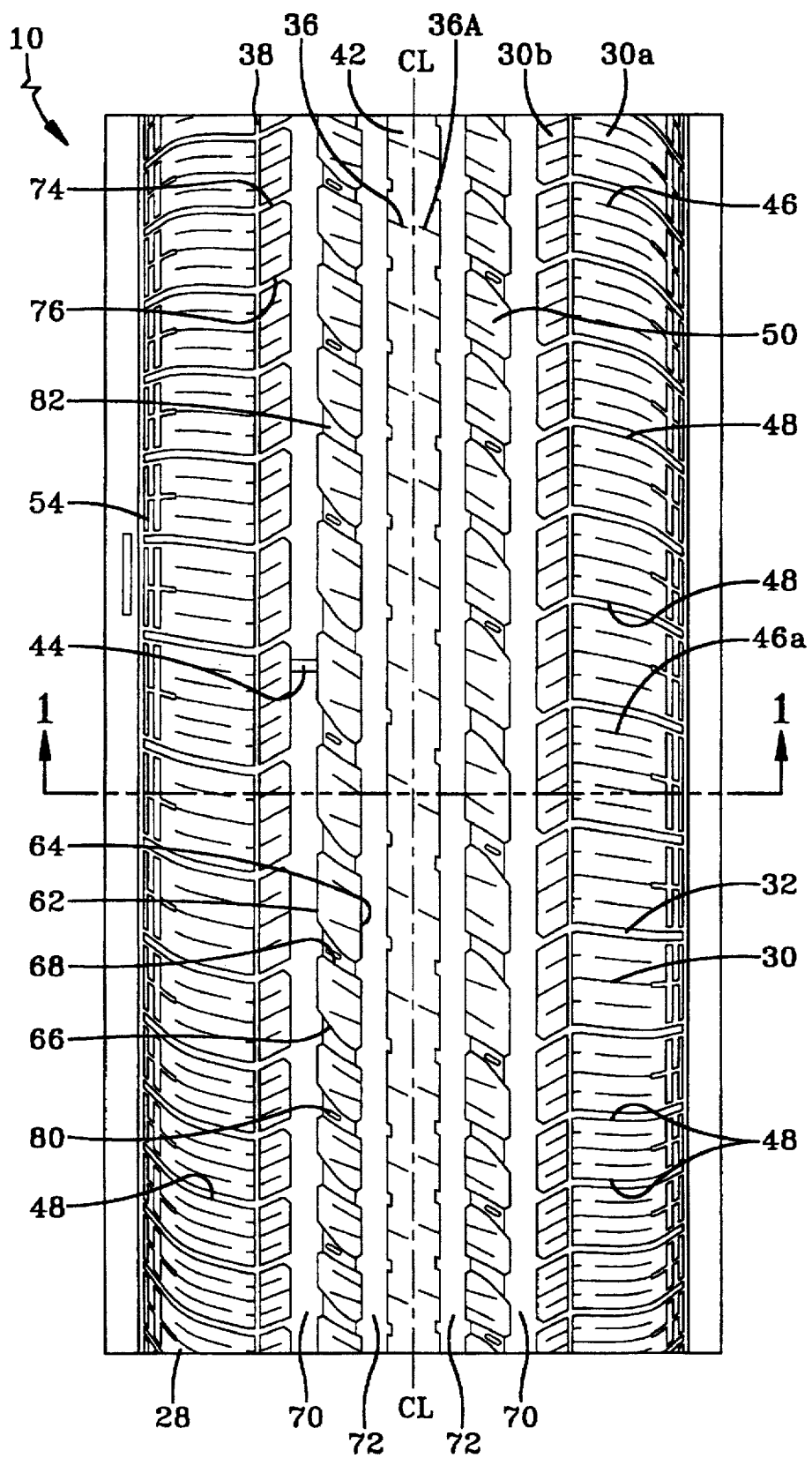
FIG. 2 illustrates a tread section of the tire of the invention.

Referring now to FIG. 2, sipes 46 in the tire 10 are located and angled to equalize the stiffness of the tread elements, and to maximize the lateral stiffness of the elements. To equalize the stiffness of tread elements, it is sometimes necessary, in the larger lugs in the pitch sequence of the tire, to include an extra sipe 46a, to minimize the difference in the length of solid rubber portions in the elements. The lengths of the sipes can be varied to further implement this equalization of lug stiffness.

Any pitching sequence which may be suitable for a particular purpose can be used in the tire of the invention. Depending on the size of the tire, 45 to 75 pitches can be used in a tire. In the illustrated embodiment, in a size P 185/65 R14 tire, a random pitching sequence employing four pitch sizes, small (S), medium (M), large (L), and extra large (X), is used which comprises 59 pitches in the sequence S L X L S S M L M S S S S S L L M X M M S S S M X L M S S L X L M S M M X X L L S M S S M L L X L M M S L S L M M S S.

Figure 3:
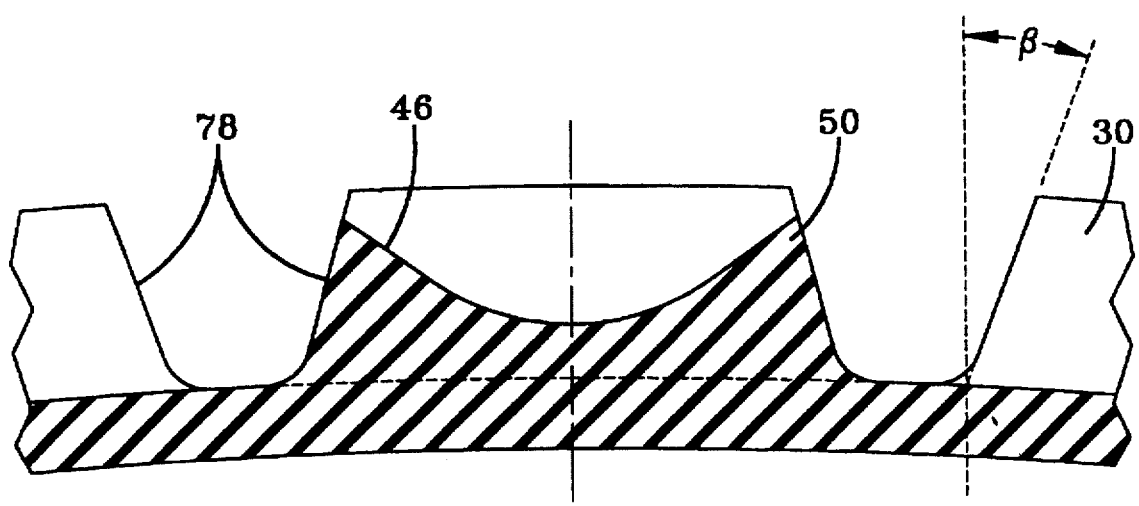
FIG. 3 illustrates a cut away side view of a block of the tire illustrating a sipe undercut.

With reference now to FIG. 3, in the illustrated embodiment all sipes 46 in shoulder blocks 30 and intermediate blocks 50 have a tapered depth such that, as the tread wears, the length of sipes 46 get shorter.

Since the sipes get smaller as the tire wears, and the shoulder lugs get stiffer as the tread depth is reduced, the scribe line is not necessary after the first 8 to 10 thousand miles of use.

Referring again to FIG. 2, to improve traction in a partially worn tire, additional sipes evolve as the tread wears. The evolving additional sipes are provided by including voids or cuts 80 in subsurface land areas such as tie bars 82, whereby when the tread is worn, new sipes open up. The subsurface voids or cuts 80 are spaced around the tire to provide an even distribution of new sipes in the partially worn tire. In the illustrated embodiment, the tie bars 82 are at the same depth in the tread as the treadwear indicators 44.

Center rib 42 has a width comprising 10.5% to 15% of the tread width of the tire, wherein the tread width is measured shoulder to shoulder on the tire, and its relatively wide width provides handling stability and quiet ride. It was found in earlier versions of the tire of the invention (the control tire mentioned in the examples), that a narrower center rib with continuous angled sipes caused slipping in the braking test, and the center rib was shown to bend and deflect when the tire rotated through the footprint. The wider center rib, and offset non-continuous sipes 36,36a in the center rib apparently eliminated this problem.

Lateral grooves in the shoulder of the tread have an angle of 75 to 90 degrees, preferably 75 to 90 degrees with respect to the center line (CL) of the tread and all said lateral grooves vary from each other in width less than 25%. Intermediate lugs 50 comprise the shape of a trapezoid wherein the bases 62, 64 of the trapezoid have a length within 20%, preferably 10%, of each other and delineate one side each of the circumferential grooves 70 and 72 of the tire. The two sides 66, 68 of the trapezoidal shape have different angles with respect to the center line (CL) of the tread, but are oriented in substantially the same direction. For example, in the illustrated embodiment, the side 66 lug wall of intermediate lug 50 has an angle of 30° to 70°, preferably 45° with respect to the CL of the tread and side 68 lug wall of intermediate lug 50 has an angle of 20°–50°, preferably 30° with respect to the CL of the tread. It is believed that the side with the larger lug, more acute wall angle provides for transitional loading of the intermediate lugs into the footprint which provides for a quieter ride. The side with the smaller lug wall angle provides for greater gripping ability of the tire when braking since most of the full width of the edge of the lug is in contact with the road surface at the same instant during braking, and substantially the full width of the lug supports the braking action.

Early embodiments of the tire of the invention showed steering and handling looseness. Such instability in a tire may be an indication that there is too much flexibility in the central region of the tire. In an effort to solve the steering and handling problems, tie bars 82 were added between the intermediate lugs 50 to improve the stability in the central region of the tire. This apparently solved the steering and handling problems.

Shoulder lugs 30 bend at an angle that complements the smaller angled side 68 of intermediate blocks 50, i.e., the inner portion 30b of the shoulder blocks 30 closest to the CL of the tire have a lateral groove wall angle that is opposite the angles of the sides of the intermediate lugs. For example, when the sides of the intermediate lugs are oriented at an angle of 25° to 80°, the lateral groove walls 74, 76 of the inner portion 30b of the shoulder blocks 30 are oriented at an angle of −30° to −50° with respect to the CL.

In a non-directional tire, as illustrated, opposite sides of the tire (as separated by the CL) will have opposite orientation of side 66, 68 and inner portion 30b lateral groove wall 74, 76 angles, as well as lateral groove 32 angles between the shoulder blocks.

The angling of sipes 46 complements the orientation of a particular lug element to maximize the stiffness equalization discussed above. For example, where the lateral groove walls 74,76 of shoulder portion 30b are at an angle of −30° to −50°, sipes in this tread element are at a similar angle so that each portion of the tread element is of a similar size.

It is believed that the location and angle of the sipes, especially in the shoulder region of the tire, increase the ride comfort and help reduce heel and toe wear on the tread elements.

Figure 4:
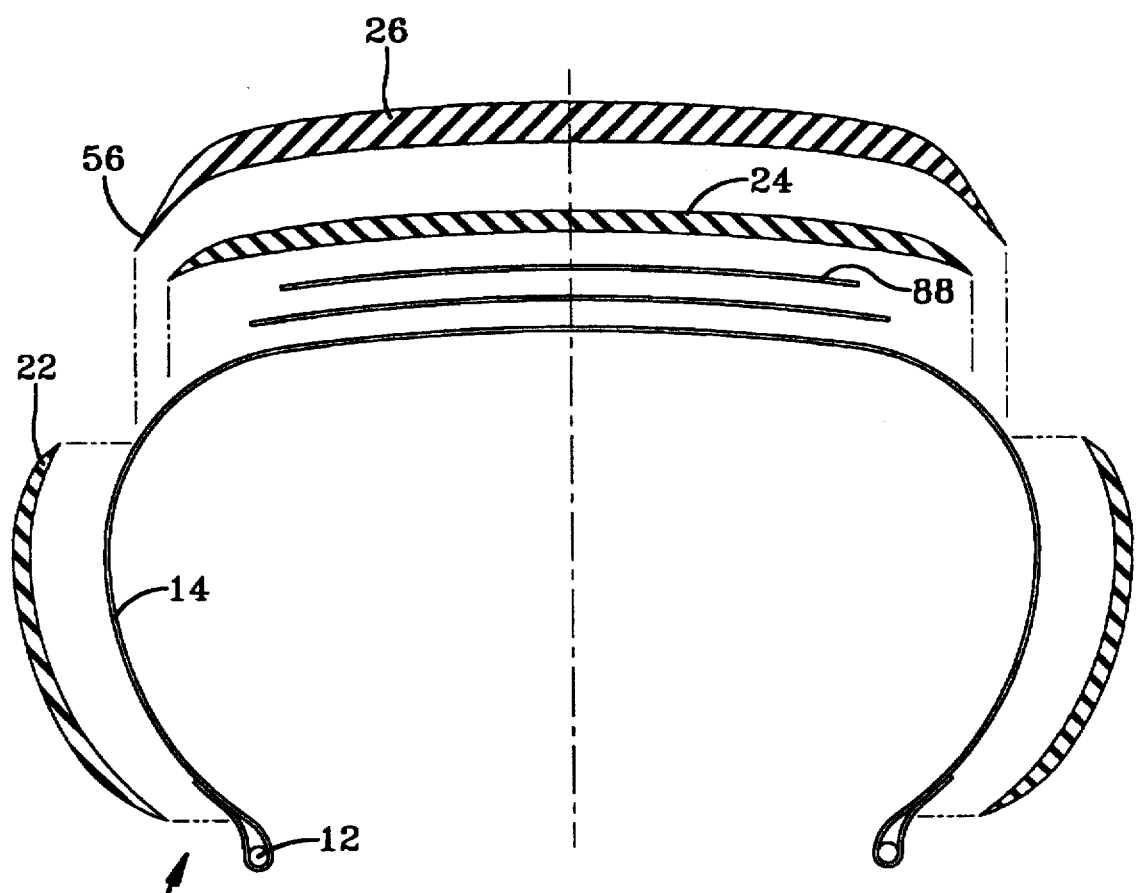
FIG. 4 illustrates an exploded view of a tire and the mini-wings therein.

With reference to FIG. 4, to provide additional traction in the shoulder region, miniwings 56 are smaller than those provided on most tires and are just large enough to cover tread base 24 to prevent exposure to ozone. As is conventional in the art, miniwings 56 comprise a soft, tacky compound which is particularly suited to seal and stick to the base compound and the sidewall, and is extruded with the tread. Since the miniwings 56 are made smaller, additional tread cap compound 26 is available for wrapping over the shoulder area of the tire for better wear and traction when the tire rolls over on the shoulder during cornering.

In addition, referring to FIG. 2, traction rectangle 54 provides grip in the tread when the tire rolls over shoulder 28 in cornering maneuvers by providing gripping edges in the shoulder of the tire. Traction rectangle 54 is high enough in shoulder 28 to comprise tread cap rubber 26 so that the portion of the tread comprising traction rectangle 54 has the same wear properties and traction properties as the tread.

To provide additional stability and smoother ride, tread wear indicators 44 may optionally be provided in a staggered arrangement within the circumferential and lateral grooves.

With reference to FIGS. 1 and 3, circumferential groove walls 78 have an angle β of 5° to 20°, preferably 7°, with respect to a line perpendicular to the tread surface. The angled circumferential groove walls make it easier for the tire to expel mud and snow from the grooves during running of the tire and provide additional void volume in the groove to help prevent hydroplaning, while providing a stable lug by providing a broad lug base.

Figure 5:
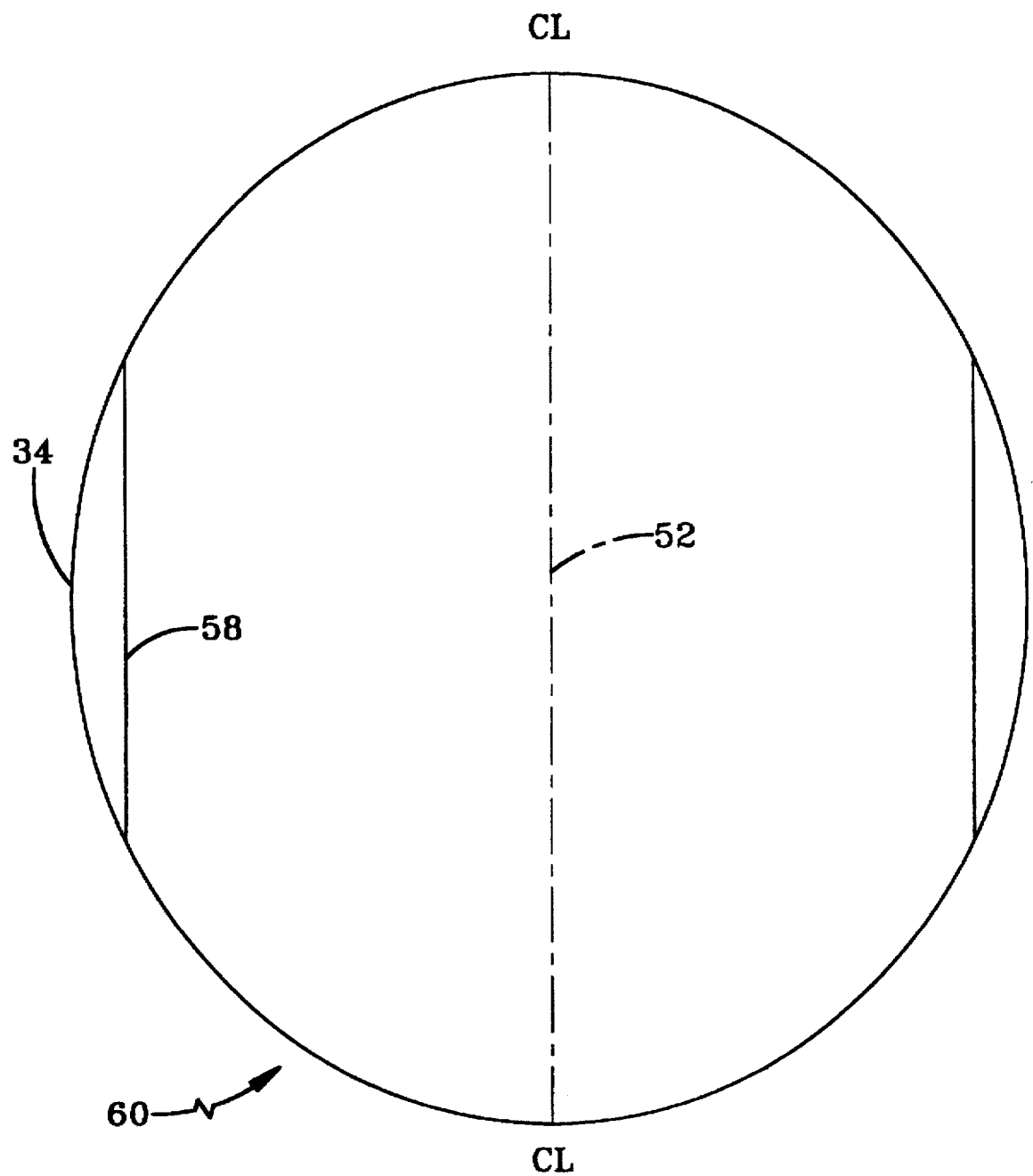
FIG. 5 illustrates the desired footprint shape for the tire of the invention.

With reference now to FIG. 5, in the illustrated embodiment, the tire of the invention has a generally oval footprint 60 with a footprint factor of 1.3 or less at standard inflation and load. The footprint factor is defined as the ratio of the footprint length 52 at the center of the tire to the footprint length 58 at the shoulder of the tire. The footprint length 58 at the shoulder of the tire is defined by a line parallel to the CL at a point located at 80% of the distance from the CL to the axial edge 34 of the footprint. It is believed that a footprint factor of 1.0 to 1.3 will be suitable for use in the invention. The particular footprint factor used is believed to provide optimal wear and handling properties for the tire.

Figure 6:
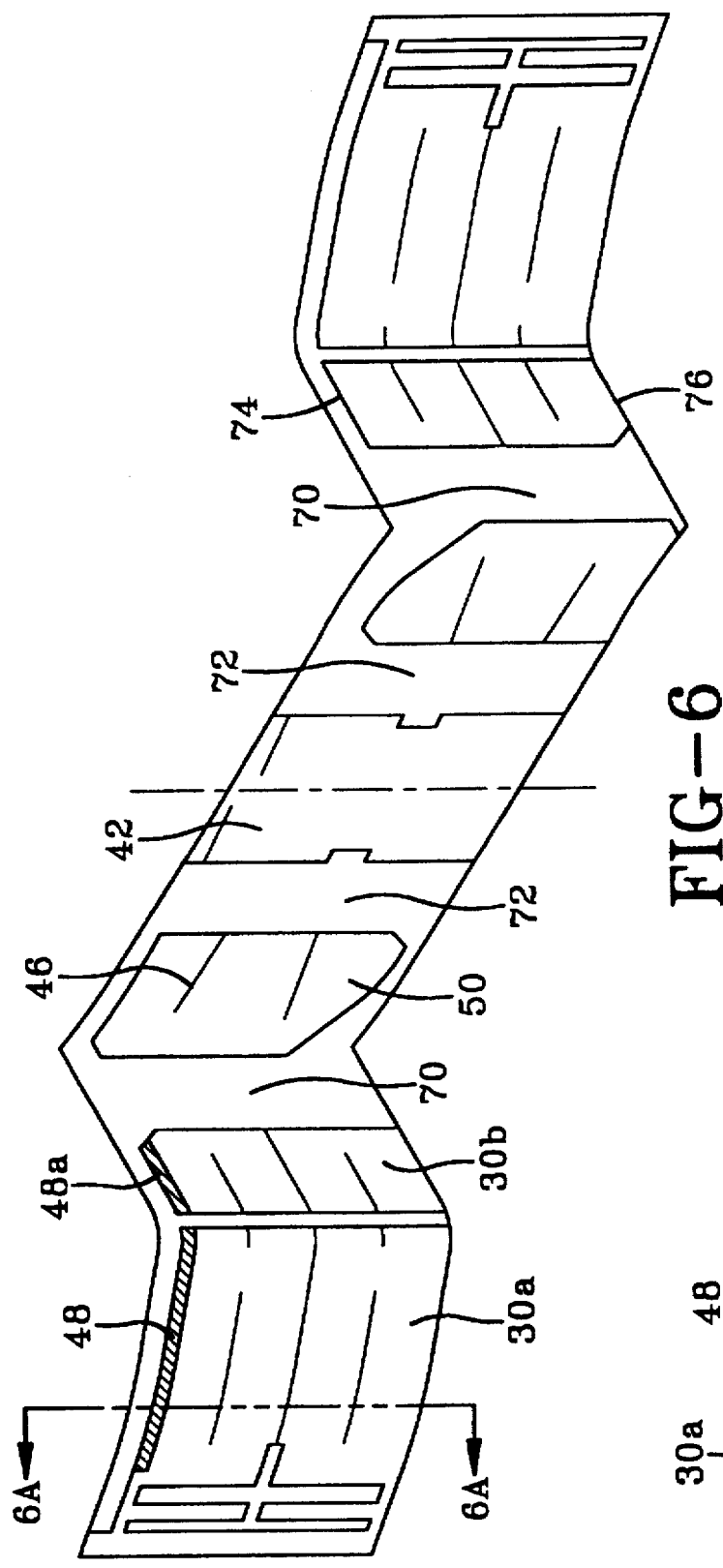
FIG. 6 is a plan view of the portion of the tire tread illustrated in FIG. 2.
Figure 6A:
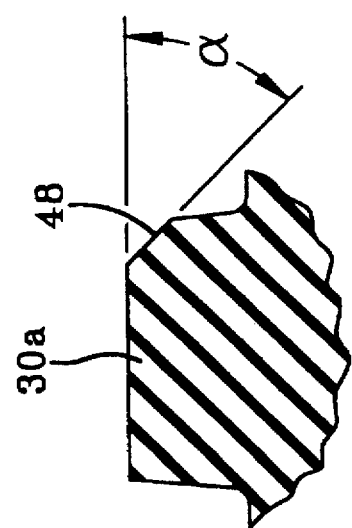
FIG. 6A is a cross section of the tread taken along line 6A—6A of FIG. 6.

With reference again to FIG. 2 and to FIG. 6, in the illustrated embodiment, at least one edge of blocks 30 along lateral grooves 32 have a chamfer 48. In the illustrated embodiment, chamfer 48 is on one side of shoulder block 30. Chamfer 48 provides a means for controlling the RSAT (residual self-aligning torque) of the tire as illustrated in copending application Ser. No. 08/588,036 to Howald et al, filed of even date herewith.

"Residual cornering force" (RCF) and "residual self aligning torque" (RSAT) are commonly monitored aspects of tire performance. Although lateral forces generated by a tire can be reduced to zero with respect to a forward velocity vector at a small slip angle (called the neutral slip angle), RSAT remains about the axis vertical to the contact patch of the tire. At a slip angle where self aligning torque is zero, a lateral force, RCF, exists and may cause the tire to drift in the lateral direction. RCF may be affected by the shape and design of the tread. RCF and RSAT may be reduced or increased by chamfering or otherwise modifying certain areas of the tire tread elements.

Conventionally, the reinforcing cords in the top belt of the tire are laid up at an angle that compensates for the pull of the road caused by the slope that is built into the road to provide drainage. To illustrate, the reinforcement cords of the top belt 88 are laid up at one angle when an automobile is designed to be driven on the right side of the road and the opposite angle when the automobile is designed to be driven on the left side of the road. The natural pull caused by the angle of the cords in the top belt 88 may be suitable for some automobiles, but will be too much or too little for other automobiles depending on their size and suspension systems. Chamfer 48 changes RSAT in one direction when placed on a lug angled in one direction, and changes RSAT in the opposite direction when placed on a lug angled in the opposite direction.

To implement the invention, a tire mold may be equipped with chamfering means for chamfering the tread elements. The chamfering means take the form of mold portions which are located in the tire mold at points where a chamfer might be required.

Preferably, the chamfer 48 does not extend to the full depth of the tread element 30. The tread elements 30 when new have a more flexible structure than when worn, which is believed to be a factor which can effect the RCF or RSAT of a new tire dramatically. As the tire wears the effect of RCF or RSAT as it relates to tread element flexibility is reduced. As the tread elements 30 wear down, the chamfer portion 48 disappears. As this occurs, the rate of tread wear decreases.

In one method for implementing the invention, tread element forming recesses in the mold may have one or more portions for forming chamfered edges along the edge of the tread element. Some of the chamfer forming portions may be selectively removed for modifying the residual cornering force or self-aligning torque of the molded tire. In one mold a majority of tread element forming recesses are initially fabricated having a chamfer forming portion at one or more edges of the respective tread element forming recesses. The preferred method is to then choose predetermined chamfer forming portions to modify the residual cornering force or residual self-aligning torque and to remove the portions of the mold that are not chosen such that selected edges of the tread elements are partially or completely unchamfered. The portions may be removed using a grinding procedure. This has essentially the same effect of altering the tire RCF and/or RSAT as adding inserts, but is generally more efficient for the tire manufacturing and development process. The chamfer portion can extend circumferentially or laterally or at any angle anywhere in between, depending on the angle of the tread element.

When inserts are used, they are placed within an existing tire mold. The inserts may be mounted into a tire mold using any acceptable mounting means, including adhesives or mechanical fasteners such as a bolt or screw. Removable chamfer mold pieces may be used to chamfer portions of the tire tread at key locations, and addition or deletion of such chamfer portions at selected locations can modify the tire's RCF and/or RSAT parameters.

The angle α that the chamfer surface of the insert makes with the tire mold's surface is chosen for each tire application, but is generally between 40 degrees and 85 degrees. Inserts can be utilized in any portion of the tire mold, and inserts can be used in multiple recesses of a tire mold at the same time.

Different manufacturers have different specifications for RSAT, and the placement and size of chamfer 48 can be used as a method of controlling the RSAT of a tire. The chamfer can be changed by grinding, and new molds are not required to meet the specifications of different manufacturers.

FIG. 6 shows a tire tread 16 with chamfered edges 48 on tread element 30.

By experimentation, it has been found that chamfering the intermediate lugs or the center rib has little effect on RSAT. In the particular tread design shown in FIGS. 2 and 6, it has been found that chamfering the lateral edges of shoulder portion 30a provides a negative shift in RSAT and chamfering the lateral edges of shoulder portion 30b provides a positive shift in RSAT. This is because the shoulder portions 30a on both sides of the tire are angled in the same direction, and shoulder portions 30b on both sides of the tire are angled in the same direction, but the angles are opposite as between shoulder portions 30a and 30b.

In the tire illustrated in the examples, the construction and the tread design is relatively neutral for RSAT, about −20 N (i.e. the tire tends to pull the car to the left with a 20 newton force). In the vehicle used for testing the tires, the suspension system requires that the tires exhibit a force of −60 N to provide the best handling and ride properties for the vehicle. By providing a chamfer on the leading edge of shoulder portion 30a on one axial side of the tire, and a chamfer on the trailing edge of shoulder portion 30a on the other axial side of the tire, the tire of the invention exhibited a RSAT of −60 N.

In the illustrated embodiment, chamfers 48 are placed on the leading edge of a lug on one shoulder and the trailing side of the lug on the opposite shoulder for a distance that comprises 30% to 80% of the length of shoulder portion 30a. The illustrated chamfer is at an angle of 45 degrees and is 1 mm deep and 1 mm wide. Those skilled in the art will recognize that both edges may be chamfered on the same tread element, and that all trailing or all leading edges of the tread elements may be chamfered, depending on the RSAT requirements of the tire.

The invention is further illustrated with reference to the following examples.

EXAMPLE 1

This example illustrates subjective results for noise, ride, handling and wet handling by a professional driver in various road conditions for a molded control tire and three carved versions of test tires.

Size: P195/70R14
Vehicle: '95 Camry LE
Code: E19 Subjective Noise, Ride, and Handling-Toyota
General Test Details 1. Wheels: 5.5 × 14 steel
2. Inflation: 30 psi
3. Load: Curb + 2 (+1 for handling)
4. Vehicle Characteristics: Stock, aligned to OE specs.
5. Vehicle Mileage: 8000 miles
6. Test Location: Akron Public Roads - Noise
   Akron TET - Noise, Ride, Handling
   I-79 near Meadville, PA - Grooved Road Wander
7. Test Date(s): 4/18–4/27/95

Conclusions

Tire Constructions Tested:

|  | Design | Compound |
|---|---|---|
| Control | 1 | Molded | A |
| Set 2 | W | Carved | C |
| Set 3 | B | Carved | C |
| Set 4 | 2 | Carved | C |

Test Set Performance Relative to Control

| Control | Set 2 | Set 3 | Set 4 |
|---|---|---|---|
| Noise | + | + | + |
| Ride | + | + | = |
| Handling | − − | = | = |
| Wet Handling | − − | − − | − |

| <---WORSE | | EQUAL | | BETTER---> |
|---|---|---|---|---|
| −− | − | = | + | ++  +++ |

Improved noise and ride properties generally indicate a better tread design, and the table shows that sets 2, 3 and 4 apparently had better tread designs than the control tire.

For handling and wet handling properties the table shows set 4 is best overall and set 4 apparently has the best tread pattern.

| Comments | Ride |
|---|---|
| Control | Tires had moderate buru-buru feel on smooth road. Gotsu-gotsu was mild. Rough road had moderate shock, but was good for amplitude. Impacts OK for amp, but sharp in feeling. |
| Set 2 | Close to control, buru—buru a little less, and the impacts felt more rounded. |
| Set 3 | Buru-buru close to controls, otherwise between the C control and set 2. |
| Set 4 | Very close to controls for all surfaces. |

The results confirm that test tires of sets 2 and 3 had better ride feel than the control and set 4.

| Comments | Noise |
|---|---|
| Control | Tires had strong sizzle noise, both when running at constant speed and when coasting down. Slight howls and whines below 40 mph with low freq, oscillating howl below 20 mph. Corner sizzle is very loud turning left, quiet turning right. Impacts sound moderate. |
| Set 2 | Pattern noise has less howls at lower speeds. Sizzle seems to be higher freq than control. Good for corner noise - more balanced between right and left turn, lower amp. Squeal noise is more sand sounding verses actual squeal sounding. |
| Set 3 | Pretty close to set 2 except sizzle noise has freq closer to control. Squeal close to set 2. |
| Set 4 | Very close to set 3 except road noise is less amp. Impacts sound closer to control level. Squeal close to set 2. |

The results confirm that the carved test tires, especially set 4, had better noise properties than the control.

| Comments | Dry Handling |
|---|---|
| Control | On center feel has fair feedback with moderate hole. Lane change has slight yaw delay between front and rear. Feedback is light, with OK grip during lane change. Cornering is moderate understeer with light feedback. Tuck-in is slight, with a hint of oversteer. Braking in turn causes oversteer, slow and controllable. Grip level slightly low. |
| Set 2 | Tires had on-center similar to control. Lane change felt more sloppy than control, with slower response and more rear slide than control. Cornering had more oversteer, quicker O/S when braking in turn. |
| Set 3 | Tires were between set 2 and control, closer to control. Rear slide was slightly more than control. |
| Set 4 | More on-center than control, with slightly smaller hole. Very similar to set 3 otherwise. |

| Comments | Wet Handling |
|---|---|
| Control | Moderate understeer with fair feedback. Response is slightly dull feeling. Braking stability is OK. Grip level is OK. |
| Set 2 | Very slippery feeling tires. Stronger U/S with less feedback and less grip. More oversteer during slalom. Tires slide very easily while braking in straight line. |
| Set 3 | Tires were more responsive with more feedback. Grip slightly better than set 2. |

-continued

| | |
|---|---|
| Set 4 | These tires were closer to control level, but not quite there. Understeer was a little stronger than control, braking traction slightly less than control. |

EXAMPLE 2

This example illustrates subjective results for noise, handling and wet handling by a professional driver under various road conditions for a molded set of Eagle GA's tested against two carved sets of experimental tires.

Size: P235/60R16
Purpose: Base Tire Development
Vehicle: '96 Olds Aurora
General Test Details 1. Wheels: 7 × 16 A1
2. Inflation: 30 psi
3. Load: curb
4. Aligned to OE specs
5. Vehicle Mileage: 1150 miles
6. Test Location: Texas
7. Test Date(s): 12/14/95

Construction Details

| Controls: | Eagle GA, molded |
|---|---|
| Set 2: | Carved 46 |
| Set 3: | Carved T5 |

SUMMARY OF RESULTS
(Performance Relative to Controls)

| | Set 2 | Set 3 |
|---|---|---|
| (Noise) | − | + |
| (Handling) | − | + |
| (Wet) | + | ++ |
| <---WORSE | EQUAL | BETTER--- |
| −−− −− − | = | + ++ +++ |

Comments - Subjective Internal Noise

| Controls: | Mild sizzle down to −16 then a slight growl to 0. Turning noise is mild and even left to right. Moderate braking tire noise. |
|---|---|
| Set 2: | Coastdown sizzle is higher amplitude than control, 20-0 is a high frequency mild amplitude howl. Road noise is more resonant than control. Braking noise is higher amplitude. Turning noise is lower amplitude than control and even. |
| Set 3: | Coastdown sizzle is lower frequency than controls but 20-0 growl is stronger. Turning noise is lower frequency. Slightly easier to initiate tire squeal than set 2. |

Comments - Subjective Handling

| Controls: | Crisp turn-in with minimal rear slide in lane change. |
|---|---|
| Set 2: | Slightly larger hole and lighter feedback on center, turn-in is not as crisp as controls, rear slide similar to controls. |
| Set 3: | Higher gain than controls, executes lane change quicker. |

Comments - Wet Handling - Front Wheel & 4 Wheel Drive

| Controls: | Moderate off throttle oversteer and power on understeer. |
|---|---|
| Set 2: | Less O.T. oversteer and power on understeer than control. |
| Set 3: | Quicker steering response and higher lateral grip than control. Off throttle oversteer between controls and set 2. |

What is claimed is:

1. A pneumatic tire comprising a pair of parallel annular beads, at least one radial carcass ply wrapped around said beads, a tread radially above a crown portion of said tire, and sidewalls disposed between said tread and said beads, wherein said tread comprises a tread base including tread base rubber and a tread cap including tread cap rubber wherein said tread base rubber has a 300% modulus of 16 to 19 MPa, a tensile strength at break of 17.5 to 22.5 MPa, elongation at break of 270 to 435%, RT (room temperature) rebound of 57 to 64, a tan delta at 10% strain of 0.075 to 0.11, G' at 1% strain of 1770 to 2070 KPa, a G' at 50% strain of 790 to 1010 KPa, and an E' of 0.1 to $0.13 \times 10^9$ dynes/cm$^2$, and said tread cap rubber has a 300% modulus of 8 to 11 MPa, a tensile strength at break of 15 to 20 MPa, an elongation at break of 420 to 530%, RT Rebound of 45 to 54, a tan delta at 10% strain of 0.090 to 0.12, G' at 1% strain of 990 to 1350 KPa, a G' at 50% strain of 540 to 700 KPa, E' of 0.06 to $0.08 \times 10^9$ dynes/cm$^2$, and wherein the tread depth in a shoulder of the tread is about 84% to 100% of the maximum tread depth and wherein lateral grooves in a shoulder of the tire have an angle of 75 to 90 degrees with respect to the center line (CL) of the tread and all said lateral grooves vary from each other in width less than 25%, and a circumferential scribe line having a depth of 8% to 16% of the maximum tread depth and a width of 2% to 5% of a shoulder block width divides a shoulder block into an inner potion and an outer portion wherein the inner portion comprises 10% to 40% of the width of the shoulder block as measured from an adjacent circumferential groove to the shoulder of the tire, and walls of circumferential grooves in said tread have an angle of 5 to 20 degrees with respect to a line perpendicular to the tread surface, and wherein said carcass is shaped in a mold to have a footprint factor of less than 1.3 at standard inflation and load.

2. The tire of claim 1 wherein said scribe line has a depth of 1 mm and a width of 1 mm.

3. The tire of claim 1 wherein said tread has a center rib having a width of 10.5% to 15% of the tread width.

4. The tire of claim 1 wherein tread wear indicators are disposed in circumferential and lateral grooves in a staggered arrangement.

5. The tire of claim 1 wherein all sipes in the tread have tapered depths.

6. The tire of claim 1 wherein the tread includes intermediate elements or ribs which are mirror images of each other.

7. The tire of claim 6 wherein tie bars are disposed around the intermediate elements to enhance the stiffness in the central region of the tire.

8. The tire of claim 1 in which each shoulder block has a chamfer on at least one lateral groove edge.

9. The tire of claim 8 wherein said chamfer is 1 mm×1 mm and extends 30% to 80% of a shoulder block portion on a shoulder side of said scribe line.

10. The tire of claim 1 wherein tie bars are located in the circumferential grooves and sipes pass through said tie bars.

11. The tire of claim 1 wherein lateral sipes are positioned in the tread to equalize stiffness of tread elements in the circumferential direction regardless of the size of the tread element.

12. A pneumatic tire comprising a pair of parallel annular beads, at least one radial carcass ply wrapped around said beads, a tread radially above a crown portion of said carcass ply, and sidewalls disposed between said tread and said beads, wherein said tread comprises a tread base including tread base rubber and a tread cap including tread cap rubber wherein said tread base rubber has a 300% modulus of 16 to 19 MPa, a tensile strength at break of 17.5 to 22.5 MPa, elongation at break of 270 to 435%, RT (room temperature) rebound of 57 to 64, a tan delta at 10% strain of 0.075 to 0.11, G' at 1% strain of 1770 to 2070 KPa, a G' at 50% strain of 790 to 1010 KPa, and an E' of 0.1 to $0.13 \times 10^9$ dynes/cm$^2$, and said tread cap rubber has a 300% modulus of 8 to 11 MPa, a tensile strength at break of 15 to 20 MPa, an elongation at break of 420 to 530%, RT Rebound of 45 to 54, a tan delta at 10% strain of 0.090 to 0.12, G' at 1% strain of 990 to 1350 KPa, a G' at 50% strain of 540 to 700 KPa, E' of 0.06 to $0.08 \times 10^9$ dynes/cm$^2$, and wherein lateral grooves in a shoulder of the tire have an angle of about 80 degrees with respect to the center line of the tread and all said lateral grooves vary in width less than 10%, and a circumferential scribe line having a depth of 8% to 16% of the maximum tread depth and a width of 2% to 5% of a shoulder block width divides a shoulder block into an inner portion and an outer portion wherein the inner portion comprises 10% to 40% of the width of the shoulder block as measured from an adjacent circumferential groove to the shoulder of the tire, and walls of circumferential grooves in said tread have an angle of 7 degrees with respect to a line perpendicular to the tread surface, and wherein said carcass is shaped in a mold to have a footprint factor of less than 1.3 at standard inflation and load, and wherein said tread at a center rib has a depth of 0.32 inch.

13. A tire tread comprising a tread base including tread base rubber and a tread cap including tread cap rubber wherein said tread base rubber has a 300% modulus of 16 to 19 MPa, a tensile strength at break of 17.5 to 22.5 MPa, elongation at break of 270 to 435%, RT (room temperature) rebound of 57 to 64, a tan delta at 10% strain of 0.075 to 0.11, G' at 1% strain of 1770 to 2070 KPa, a G' at 50% strain of 790 to 1010 KPa, and an E' of 0.1 to $0.13 \times 10^9$ dynes/cm$^2$, and said tread cap rubber has a 300% modulus of 8 to 11 MPa, a tensile strength at break of 15 to 20 MPa, an elongation at break of 420 to 530%, RT Rebound of 45 to 54, a tan delta at 10% strain of 0.090 to 0.12, G' at 1% strain of 990 to 1350 KPa, a G' at 50% strain of 540 to 700 KPa, E' of 0.06 to $0.08 \times 10^9$ dynes/cm$^2$, and wherein the tread depth in a shoulder of the tread is about 84% to 100% of the maximum tread depth and wherein lateral grooves in a shoulder of the tire have an angle of 75 to 90 degrees with respect to the center line (CL) of the tread and all said lateral grooves vary from each other in width less than 25%, and a circumferential scribe line having a depth of 8% to 16% of the maximum tread depth and a width of 2% to 5% of a shoulder block width divides a shoulder block into two portions wherein an inner portion has a width comprising 10% to 40% of the width of the shoulder block as measured from an adjacent circumferential groove to the shoulder of the tread, and walls of circumferential grooves in said tread have an angle of 5 to 20 degrees with respect to a line perpendicular to the tread surface.

14. The tread of claim 13 wherein all sipes in the tread have tapered depths.

15. The tread of claim 13 wherein the tread includes intermediate elements or ribs which are mirror images of each other.

16. The tire of claim 15 wherein tie bars are disposed around the intermediate elements to enhance the stiffness in the central region of the tire.

17. The tread of claim 13 in which each shoulder block is chamfered on at least one lateral groove edge.

18. The tread of claim 17 wherein said chamfer is 1 mm×1 mm and extends 30% to 80% of a shoulder block portion on a shoulder side of said scribe line.

19. The tread of claim 13 wherein lateral sipes are positioned in the tread to equalize stiffness of tread elements in the circumferential direction regardless of the size of the tread element.

20. The tread of claim 13 wherein all lateral grooves between shoulder blocks are the same width.

* * * * *